Sept. 25, 1973  F. STERZER  3,761,264
METHOD OF DEFINING A DETAILED PATTERN ON A SURFACE OF A BODY
Filed Oct. 12, 1971  3 Sheets-Sheet 1

INVENTOR.
Fred Sterzer
BY Arthur J. Spechler
ATTORNEY

INVENTOR
Fred Sterzer
BY Arthur J. Spechler
ATTORNEY

Sept. 25, 1973  F. STERZER  3,761,264
METHOD OF DEFINING A DETAILED PATTERN ON A SURFACE OF A BODY
Filed Oct. 12, 1971  3 Sheets-Sheet 3

INVENTOR
Fred Sterzer
BY Arthur J. Spechler
ATTORNEY

United States Patent Office 3,761,264
Patented Sept. 25, 1973

3,761,264
METHOD OF DEFINING A DETAILED PATTERN ON A SURFACE OF A BODY
Fred Sterzer, Princeton, N.J., assignor to RCA Corporation
Filed Oct. 12, 1971, Ser. No. 188,185
Int. Cl. G03c 11/00
U.S. Cl. 96—46                             7 Claims

ABSTRACT OF THE DISCLOSURE

A detailed pattern on a photomask is defined, in reduced size, on a surface of a body by a novel photolithographic process employing two successive Fresnel diffraction printings. The surface of the body is provided with three layers, a lower photoresist, a metal, and an upper photoresist, respectively. The upper photoresist is exposed with a Fresnel diffraction pattern of the detailed pattern for a time to activate it with only the greater intensities of light of the Fresnel diffraction pattern. The developed upper photoresist defines the detailed pattern, in reduced size, on the layer of metal. The lower photoresist is similarly exposed and activated through an etched mask of the layer of metal, as defined by the upper photoresist. When developed, the lower photoresist defines the detailed pattern, still further reduced in size, on the surface of the body.

BACKGROUND OF THE INVENTION

This invention relates generally to a method of defining a detailed pattern on a surface. More particularly, the invention relates to a novel method of defining a detailed pattern on a surface, in reduced dimensions, by Fresnel diffraction printing.

It has been proposed to define a pattern on a surface of a body by producing the pattern on a photoresist, as by contact printing with a photomask. Contact printing, however, presents some difficulties. In contact printing, for example, small isolated defects in the photomasks are reproduced in the photoresist. Also, each contact of the photomask with the photoresist may result in scratches on the photomask or in unwanted opaque foreign materials adhering thereto. The accumulation of such defects in a photomask severely limits its lifetime, and its replacement is a significant factor in the cost of production of the ultimate product.

It has also been proposed to expose a photoresist through a photomask slightly separated from the photoresist by Fresnel diffraction printing. By properly spacing the photomask from the image surface, it has been possible to expose a photoresist on the image surface with a diffraction pattern of the image to be reproduced. The varying optical density of the diffraction pattern is a function of the distance of the mask from the image surface, and this diffraction pattern can vary without changing the mask. Also, since the diffraction patterns are formed by more than one light beam, small defects due to scratches, for example, in the photomask are usually eliminated in the defined (printed) image.

In accordance with the novel method, it is possible to define a pattern on a surface of a body (by means of a patterned layer of material on the surface) wherein the defined pattern has dimensions relatively much smaller than those possible by either projection printing, contact printing, or by a single Fresnel diffraction printing.

SUMMARY OF THE INVENTION

The novel method of defining a detailed pattern on a surface of a body comprises providing the surface with a lower photoresist, a layer of opaque material over the lower photoresist, and an upper photoresist over the layer of opaque material. The upper photoresist is exposed by an image of the detailed pattern, and then developed to define an image of the detailed pattern on the layer of opaque material. A portion of the layer of opaque material, uncovered by the developed upper photoresist, is removed, thereby providing a mask of the image (as defined by the developed upper photoresist). The lower photoresist is next exposed through the mask of opaque material and then developed to define an image of the detailed pattern on the surface of the body.

In a preferred embodiment of the novel method, the thickness of the lower photoresist is such that the mask of opaque material produces a Fresnel diffraction pattern of the detailed pattern in varying intensities of light on the surface of the body, and the exposure time is such that only the greater intensities of light of the diffraction pattern activate the lower photoresist, whereby the developed lower photoresist defines an image in reduced size of the detailed pattern.

In another embodiment of the novel method, the upper photoresist is also exposed through a photomask at such a distance from the layer of opaque material to produce a Fresnel diffraction pattern of the detailed pattern in varying intensities of light on the layer; and the exposure time is such that only the greater intensities of light of the diffraction pattern activate the upper photoresist.

In accordance with the novel method, an image of either a transparent or an opaque line, for example, on a photomask can be defined on the surface of a body so that the width of the line defined on the surface is relatively much narrower than the original line on the photomask. The novel method has the advantage of enabling one to print detailed patterns in reduced size from photomasks having the detailed patterns in larger dimensions. Also, detailed patterns can be printed, in reduced size, from photomasks already having the smallest dimensions possible.

DESCRIPTION OF THE PREFERRED EMBODIMENTS

Figure 1:
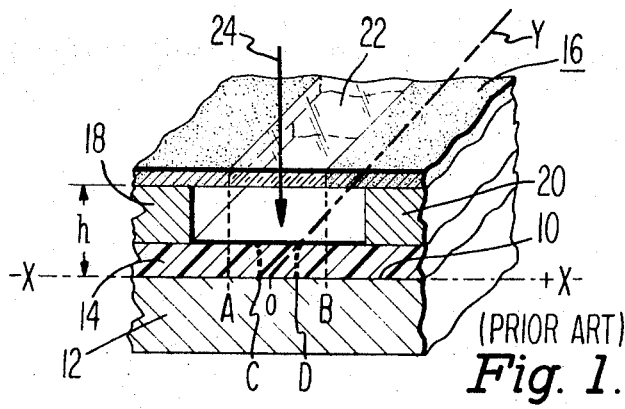
FIG. 1 is a fragmentary cross-sectional and perspective view of an arrangement for exposing a photoresist on a surface of a body by Fresnel diffraction printing, in accordance with the prior art method of Fresnel diffraction printing.

Referring now to FIG. 1, there is shown, in accordance with the prior art, an arrangement for defining a pattern (line) on a surface 10 of a body 12, such as a wafer of silicon, by Fresnel diffraction printing. A positive photoresist 14, such as Shipley AZ–1350, made by Shipley Co., Inc., Wellesley, Mass., for example, is applied on the surface 10, and a photomask 16 is disposed above the surface 10, at a distance $h$ therefrom, by means of suitable spacers 18 and 20, the distance $h$ being equal to the thickness of the spacers 18 and 20 plus the thickness of the photoresist 14. The photomask 16 has a pattern of a transparent (slit) line 22, the detailed pattern that it is desired to define on the surface 10 by the photoresist 14. The width of the line 22 may be as small as is encountered in certain integrated circuit technology, that is a few microns.

Figure 14:
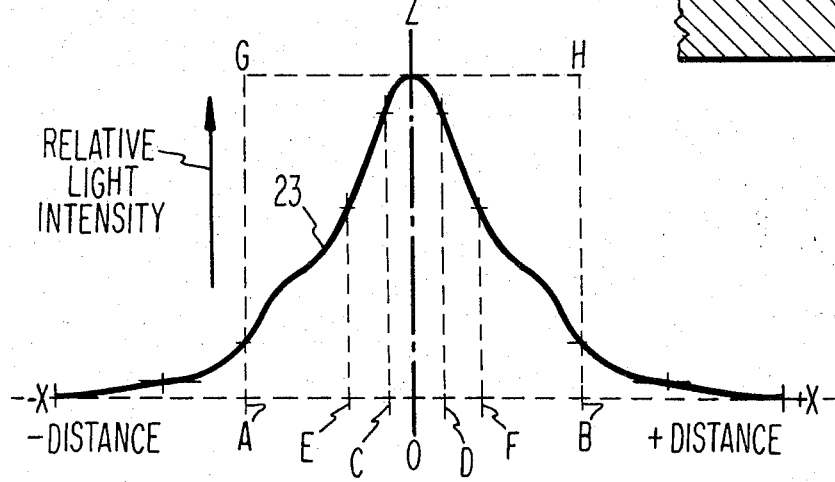
FIG. 14 is a graph (light intensity curve) of an example of the varying optical density of a Fresnel diffraction pattern produced by a transparent line (slit)

If the distance $h$ is between 1 and 10 times the width AB of the line 22, and if the photoresist 14 is exposed through the photomask 16 with substantially collimated and monochromatic light (such as a mercury arc having a wavelength of .4368 micron, and indicated by arrow 24), a Fresnel diffraction pattern is formed on the surface 10 of the body 12, the photoresist 14 being substantially transparent to light. The width AB of the line 22 should not be more than 100 times the wavelength of the light used for the exposure. The optical density, that is, the light intensity of the Fresnel diffraction pattern projected on the surface 10, as measured along the width of the projected pattern, varies. For example, the graph of FIG. 14 is a light intensity curve 23, showing variations in light intensities of a Fresnel diffraction pattern of a transparent line having a thickness of 6 microns and spaced at a distance of 20 microns from the surface 10 (image plane) of the body 12. In the graph, the line AB corresponds to a distance of 6 microns on the surface 10. The greatest light intensity of the Fresnel diffraction pattern is at the center of the projected pattern.

Figure 2:
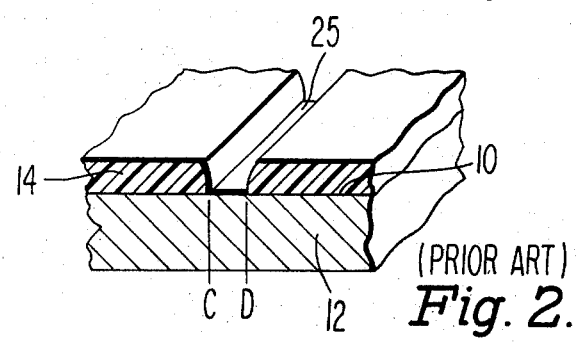
FIG. 2 is a fragmentary cross-sectional and perspective view of the developed photoresist defining a pattern on the surface of the body shown in FIG. 1, as produced by the prior art.

If the photoresist 14 (FIG. 1) is exposed for a period of time such that only the greater intensities of the diffraction pattern activate the photoresist 14, only a portion of the diffraction pattern will be printed (when developed), thereby reducing the size of the printed image (defined by the developed photomask 14) with respect to the size of the image on the photomask 16. For example, if the photoresist 14 is activated only by the greater intensities of light represented by the light intensity curve 23 between the lines C and D of FIG. 14, the developed photoresist 14 will define a pattern 25 of the line 22, in reduced size (width CD), on the surface 10 of the body 12, as shown in FIG. 2. If the exposure time were longer, such that the light intensities between the lines E and F of the curve 23 activated the photoresist 14, the defined pattern 25 of the line would be wider. The dashed rectangle AGHB represents the ideal projected image of the transparent line 22.

Figure 17:
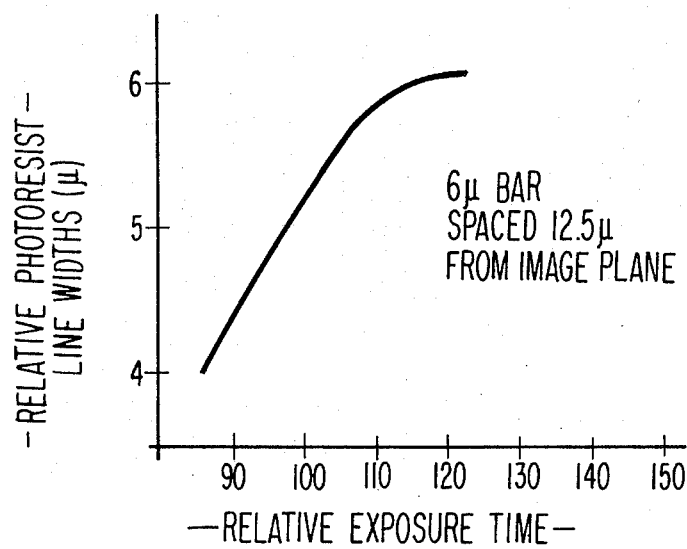
FIG. 17 is a graph of the variations in the widths of a line (slit) printed by Fresnel diffraction patterns while using different exposure times.

Since the time period during which the photoresist 14 is exposed determines the light intensities (of the light intensity curve 23) that activate the photoresist 14, it is possible to expose the photoresist 14 for different periods of time and to construct a graph, such as shown in FIG. 17, wherein the relative line widths, defined by the photoresist 14, can be plotted against relative exposure times. The graph of FIG. 17 was obtained by exposing, with different exposure times, a transparent line 22 of 6 microns width at a distance $h$ of 20 microns from the surface 10 of the body 12 with a mercury vapor lamp ($\lambda = .4368$ micron). With an exposure time of about 90 seconds, the developed width of the pattern 25 in the photoresist 14 was a little over 4 microns. With an exposure time of 100 seconds, the defined pattern 25 was a little over 5 microns; and, with an exposure time of 120 seconds, the defined pattern 25 was about 6 microns.

Figure 3:
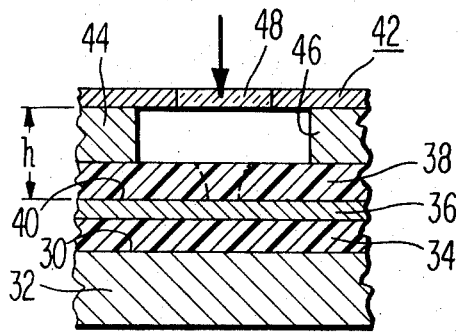
FIGS. 3-13 are fragmentary cross-sectional views of a body in different stages of the novel method of defining a pattern of a transparent line (slit) on a surface of the body.

Referring now to FIG. 3, there is shown an arrangement for defining a pattern of a transparent line (slit) on the surface 30 of a body 32, such as a wafer of silicon, by the novel method employing two successive Fresnel diffraction printings to define a pattern of a reduced size not heretofore possible. A positive lower photoresist 34 is applied to the surface 30 of the body 32, and a layer 36 of an etchable opaque material, such as aluminum, for example, is disposed over the upper surface of the lower photoresist 34. A positive upper photoresist 38 is disposed over the upper surface 40 of the layer 36 by any suitable means, and a photomask 42 is spaced a distance $h$ from the surface 40 of the layer 36 by spacers 44 and 46. The photomask 42 is formed with a detailed pattern 48 of a line of a few microns width similar to the line 22 of the photomask 16 in FIG. 1. The application of the photoresists 34 and 38 are by conventional photolithographic techniques, well known in the art. The layer 36 of aluminum may be deposited by vapor deposition in an evacuated environment.

Figure 4:
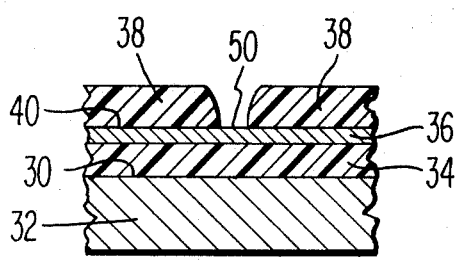

In accordance with the novel method, it is desired to define the pattern of line 48 of the photomask 42 on the surface 30 of the body 32 by means of a pattern defined in the developed photoresist 34. To this end, the line 48 is first defined, in reduced size, on the surface 40 of the layer 36 of opaque material by a first Fresnel diffraction printing, as described for defining the line 22 on the surface 10 of the body 12 in FIGS. 1 and 2. Thus, a detailed pattern 50 of the line 48 of the photomask 42 is defined in reduced size, in the developed photoresist 38, as shown in FIG. 4.

Figure 5:
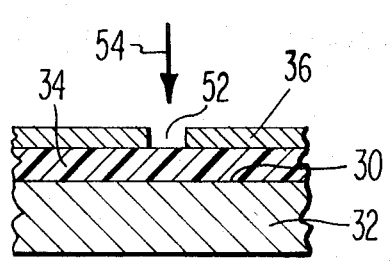

In accordance with the novel method, the pattern 50 will be defined, in reduced size, by an additional Fresnel diffraction projection on the surface 30 of the body 32. To this end, the portion of the layer 36 exposed by the developed photoresist 38 is etched away by any suitable means well known in the integrated circuit art, and the photoresist 38 is removed, to provide a detailed pattern 52 in the layer 36, as shown in FIG. 5. Thus, the layer 36 comprises a mask with a light transmitting pattern 52 to be reproduced on the surface 30 of the body 32.

Figure 6:
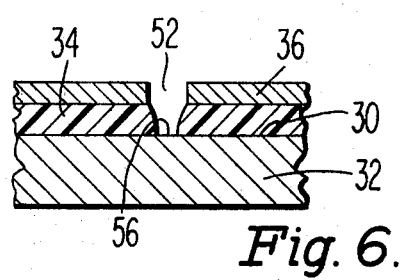

The thickness of the photoresist 34 is such that it is between 1 and 10 times the width of the detailed pattern 52 in the layer 36. Under these conditions, the photoresist 34 can be exposed with light to which it is responsive, as indicated by arrow 54 in FIG. 5, to produce a Fresnel diffraction pattern (through the photoresist 34) on the surface 30 of the body 32. The width of the detailed pattern should not be more than 100 times the wavelength of the light used for the exposure (i.e., if the wavelength of light used is 0.4368 micron. The maximum width of the detailed pattern should be 43.68 microns). Since the light intensity curve of the Fresnel diffraction pattern comprises different light intensities, as illustrated, for example, in FIG. 14, and as explained supra, by exposing the photoresist 34 for a time period such that only the greater intensities of light of the diffraction pattern activate it, the photoresist 34 will, when developed by means well known in the photolithoraphic art, define a pattern 56 on the surface 30 of the body 32 that has a reduced width with respect to the pattern 52 in the layer 36, as shown in FIG. 6.

Figure 7:
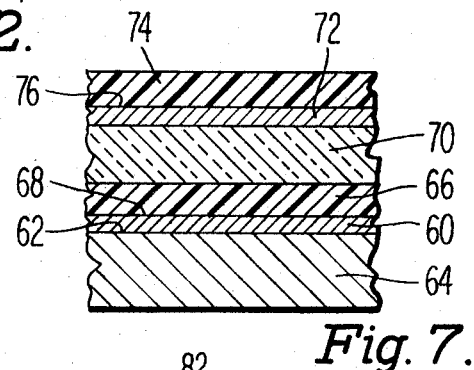

In FIG. 7, there is shown an arrangement for defining a detailed pattern (such as the slit 48 in the photomask 42 (FIG. 3)) in a layer 60 of an etchable material, such as a metal on the surface 62 of a body 64. A positive lower photoresist 66 is applied over the upper surface 68 of the layer 60. An etchable layer 70 of a transparent material, such as glass or silicon dioxide, for example, is applied over the photoresist 66. A layer 72 of an etchable opaque material, such as aluminum, is applied over the layer 70, and an upper positive photoresist 74 is applied over the upper surface 76 of the layer 72, by any suitable means known in the photolithographic and semiconductor art.

Figure 8:
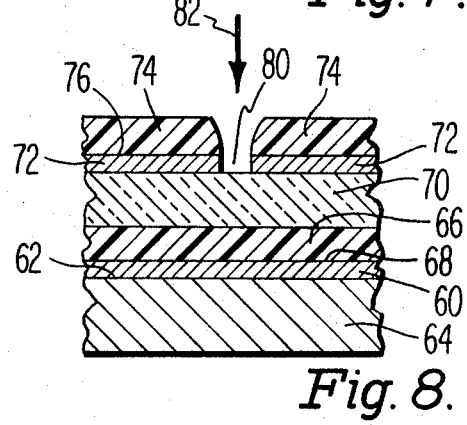
Figure 9:
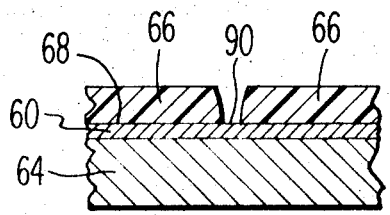
Figure 10:
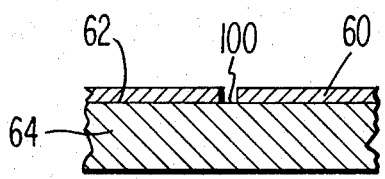

Referring now to FIG. 8, the upper photoresist 74 is shown as having been exposed and developed, in the manner explained supra, to include an image (slit) of a detailed pattern 80 to be defined, in reduced size, on the surface 62 of the body 64. The portion of the layer 72, uncovered by the developed photoresist 74 is illustrated as being etched away to define a detailed pattern 80. The layer 72 with the detailed pattern 80 formed therein now constitutes a mask for exposing the lower photoresist 66 through the transparent layer 70 with a Fresnel diffraction image. The combined thickness of the photoresist 66 and the transparent layer 70 should be between 1 and 10 times the width of the detailed pattern 80, and the width (smallest dimension) of the detailed pattern should not be more than 100 times the wavelength of the light used for the Fresnel projection, so that the light, indicated by the arrow 82, will provide a suitable Fresnel diffraction pattern (through the photoresist 66 and the transparent layer 70) at the surface 68 of the layer 60, in accordane with the novel method. The time of exposure of the photoresist 66 is such that only the greater intensities of the diffraction pattern activate the photoresist 66, to thereby define a reduced detailed pattern 90 by the developed photoresist 66, as shown in FIG. 9. The transparent layer 70 is etched away, before the development of the photoresist 66, by any suitable means known in the art. The detailed pattern 90 on the surface 68 of the layer 60, defined by the developed photoresist 66, is then etched away by any suitable means to define a detailed pattern 100 on the surface 62 of the body 64, as shown in FIG. 10.

Figure 11:
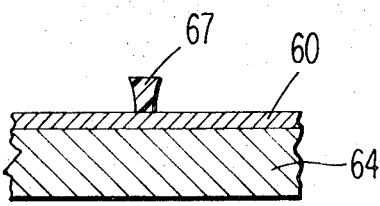
Figure 12:
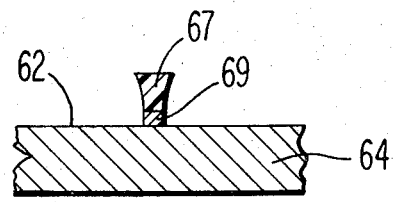
Figure 13:
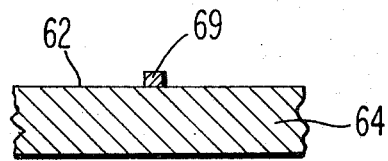

The pattern 100 can also be defined on the surface 62 of the body 60 by a portion of the layer 60 instead of by an etched away portion therein. To this end, the photoresist 66 is a negative photoresist instead of a positive photoresist so that, when developed, after activation by only the greater light intensities of the Fresnel diffraction pattern, a portion 67 (FIG. 11) of the layer 66 remains on the layer 60. The portions of the layer 60 uncovered by the developed negative photoresist 66 are then etched away by any suitable means, leaving a portion 69 of the layer 60 to define the detailed pattern, in reduced size, on the surface 62 of the body 64, as shown in FIG. 12. The portion 67 of the negative photoresist is then removed by any suitable means known in the art, leaving the desired detailed pattern, portion 69 of the layer 60, on the surface 62 of the body 64, as shown in FIG. 13.

Figure 15:
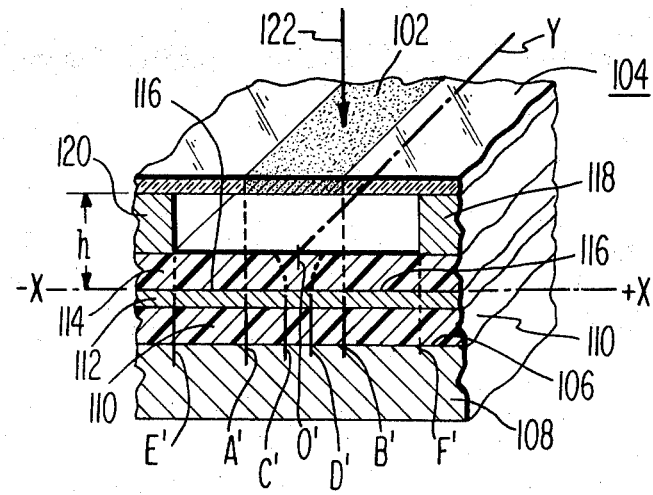
FIG. 15 is a fragmentary cross-sectional and perspective view of apparatus for Fresnel diffraction printing of an opaque line.

Referring now to FIG. 15, there is shown an arrangement for defining a detailed pattern of an opaque line 102 on a photomask 104, in reduced size, on the surface 106 of a body 108, in accordance with the novel method. A positive photoresist 110 is applied over the surface 106 of the body 108. A layer 112 of an etchable opaque material, such as aluminum, is applied over the photoresist 110, and a positive photoresist 114 is applied over the upper surface 116 of the layer 112. The photomask 104 is spaced a distance $h$ from the surface 116 of the layer 112 by suitable spacers 118 and 120.

If the distance $h$ is between 1 and 10 times the width of the detailed pattern, line 102, a Fresnel diffraction pattern of varying light intensities will be produced on the surface 116 when the photoresist 114 is exposed by light of a wavelength not less than 0.01 of the width of the detailed pattern through the photomask 104, as indicated by the arrow 122. Under the conditions stated, the Fresnel diffraction pattern of the line 102 will vary in intensity as, for example, according to a light intensity curve 124 illustrated in FIG. 16.

Figure 18:
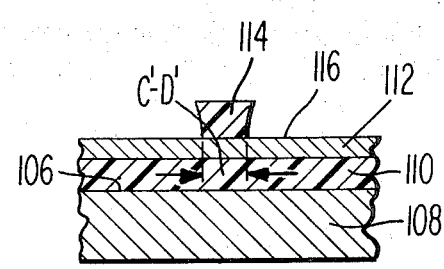
FIGS. 18-20 are fragmentary cross-sectional views of a body in different stages of the novel method of defining a pattern of an opaque line on a surface of the body.

It will be observed from the shape of the light intensity curve 124 that the amount of the photoresist activated will vary in size in accordance with the time period of exposure. For example, referring to FIG. 16, an exposure time such that the photoresist 114 is activated only by light intensities E'C' and D'F' will define an opaque line pattern having a width of C'D'. Thus, it is possible by Fresnel diffraction pattern to project an image of a solid line and to activate a photoresist so that the pattern of the line is defined at the image plane in a reduced size by the developed photoresist, as shown in FIG. 18.

Figure 19:
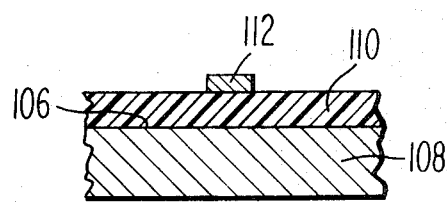

The developed photoresist 114 defines a reduced pattern of the line 102 on the surface 116 of the layer 112 of opaque material. The line pattern can be reduced still further, in accordance with the novel method, by etching away those portions of the layer 112 uncovered by the developed photoresist 114, as shown in FIG. 19.

Figure 16:
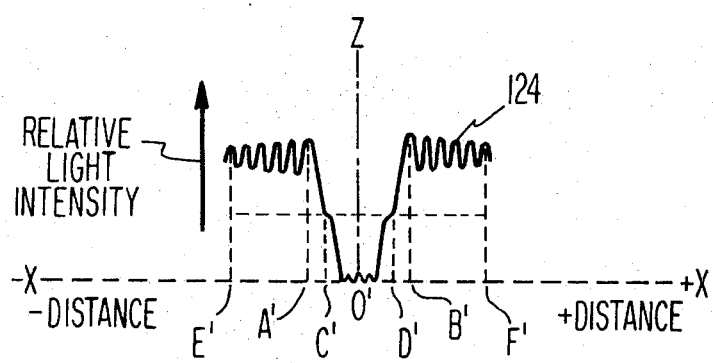
FIG. 16 is a graph (light intensity curve) of an example of the varying optical density of a Fresnel diffraction pattern produced by an opaque line.
Figure 20:
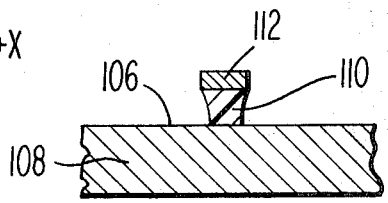

The thickness of the photoresist 110 should be between 1 and 10 times the width of the line pattern defined by the layer 112 (FIG. 19) to produce a Fresnel diffraction pattern that has a light intensity curve somewhat similar to the curve 124 shown in FIG. 16. By exposing the positive photoresist 110 with light (of a wavelength not less than 0.01 of the width of the line pattern defined by the layer 112) for a time such that the greater intensities of light produce a diffraction pattern on the surface 106, and developing the photoresist 110, the developed photoresist 110 will define the desired detailed pattern of the line on the surface 106, in reduced size, as shown in FIG. 20.

The novel method of defining a detailed pattern on a surface of a body is particularly useful in the manufacture of high resolution silicon storage targets for storage tubes and for the production of high resolution integrated circuit patterns whose smallest dimension may be one micron or less. Since the usual resolution with lens projection printing is about 2.5 microns, and about one micron with a contact mask, the novel method may be used in conjunction with the aforementioned printing methods to obtain still further reduction of the defined detailed patterns.

When using Fresnel diffraction printing, in accordance with the novel method, the distance between the mask and the image plane should be between 1 and 10 times the width of the smallest dimension (i.e., line width) that it is desired to image. Generally, the width of the smallest dimension and its distance from the image plane should be of the same order of magnitude, and that magnitude should not be greater than the wavelength of the light used to project the Fresnel diffraction pattern by more than 2 orders of magnitude. Thus, the original width of the smallest dimension that can be imaged should not be greater than about 100 times the wavelength of the light employed for the Fresnel diffraction printing. For example, if a mercury arc light has a wavelength of 0.4368 micron, the maximum width of a dimension to be imaged should not be greater than 43.6 microns and the distance $h$, between the object to be imaged and the image plane, should preferably not be greater than 436 microns.

While the novel method has been illustrated herein with examples of defining a line pattern on a surface of a body, the novel method is not limited thereto, and patterns of all shapes, such as circles, triangles, and irregular areas of small dimensions may also be defined.

What is claimed is:

1. A method of defining a detailed pattern on a surface of a body comprising the steps of:
    applying a lower photoresist over said surface, the thickness of said lower photoresist being between 1 and 10 times the smallest dimension of said detailed pattern,
    applying a first opaque layer of metal over said lower photoresist,
    applying an upper photoresist over said first layer,
    exposing said upper photoresist with a light image of said detailed pattern,
    developing said upper photoresist to remove a portion thereof so that the remaining portion of it defines a first image of said detailed pattern on said first opaque layer, etching away a portion of said first opaque layer so that the remaining portion of it forms a mask of said first image, and exposing said lower photoresist to light having a wavelength that is not less than 0.01 of said smallest dimension and producing a Fresnel diffraction pattern of different light intensities on said surface of said body, said Fresnel diffraction pattern having greater light intensities in the middle portion thereof than at the opposite end portions thereof when said Fresnel diffraction pattern is of a transparent (slit) line, and greater light intensities at the opposite end portions thereof than in the middle portion thereof when said Fresnel diffraction pattern is of a solid (opaque) line, and exposing said lower photoresist for a time such that only the greater intensities of said different light intensities activate said lower photoresist, whereby said second image of said detailed pattern is smaller than said first image of said detailed pattern.

2. A method of defining a detailed pattern on a surface as defined in claim 1, wherein:

said smallest dimension of said detailed pattern is not greater than 100 times the wavelength of said light.

3. A method of defining a detailed pattern on a surface as described in claim 1, wherein:

the step of exposing said upper photoresist with a light image of said detailed pattern comprises:

spacing a photomask of a third image of said detailed pattern from said first opaque layer of metal and from said upper photoresist to produce thereon a Fresnel diffraction pattern of different light intensities, said Fresnel diffraction pattern having greater light intensities in the middle portion thereof than at the opposite end portions thereof when said Fresnel diffraction pattern is of a transparent (slit) line, and greater light intensities at the opposite end portions thereof than in the middle portion thereof when said Fresnel diffraction pattern is of a solid (opaque) line, and exposing said upper photoresist through said photomask for a time such that only the greater intensities of said different light intensities activate said upper photoresist, whereby said first image of said detailed pattern is smaller in dimension than said third image of said detailed pattern.

4. A method of defining a detailed pattern on a surface as described in claim 3, wherein:

said light has a wavelength not less than 0.01 times the smallest dimension of said detailed pattern to be defined, said said photomask is spaced from said first opaque layer of metal a distance between 1 and 10 times said smallest dimension.

5. In a method of defining a detailed pattern on a surface of a body, wherein an upper photoresist is exposed with an image of the detailed pattern and developed to define a first image of said detailed pattern, the improvement comprising the steps of:

providing a lower photoresist over said surface of said body, the thickness of said lower photoresist being between 1 and 10 times the smallest dimension of said detailed pattern, and a first opaque layer of metal between said lower photoresist and said upper photoresist, etching away a portion of said first opaque layer, uncovered by said developed upper photoresist, so that the remaining portion of it forms a mask of said first image, exposing said lower photoresist through said mask to light, having a wavelength not less than 0.01 of the smallest dimension of said detailed pattern of said mask, to produce a Fresnel diffraction pattern of varying light intensities on said surface of said body, said Fresnel diffraction pattern having greater light intensities in the middle portion thereof than at the opposite end portions thereof when said Fresnel diffraction pattern is of a transparent (slit) line, and greater light intensities at the opposite end portions thereof than in the middle portion thereof when said Fresnel diffraction pattern is of a solid (opaque) line, and exposing said lower photoresist for a time period such that only the greater light intensities of said varying light intensities activate said lower photoresist, whereby the developed lower photoresist defines said second image of said detailed pattern on said surface in reduced dimensions.

6. In a method of defining a detailed pattern on a surface of a body as described in claim 5, wherein:

the thickness of said lower photoresist is not greater than 2 orders of magnitude than said wavelength of said light.

7. In a method of defining a detailed pattern on a surface of a body as described in claim 6, wherein:

a second layer of etchable transparent material is disposed between said lower photoresist and said first layer of opaque material, and the combined thickness of said lower photoresist and said second layer is between 1 and 10 times the smallest dimension of said detailed pattern on said mask.

References Cited

UNITED STATES PATENTS

| | | | |
|---|---|---|---|
| 3,647,438 | 3/1972 | Heiman | 96—116 |
| 3,625,686 | 12/1971 | Kitano | 96—27 |
| 3,506,441 | 4/1970 | Gottfried | 96—36.2 |
| 3,576,630 | 4/1971 | Yanagawa | 96—36.2 |

OTHER REFERENCES

Hallen et al.: "Semiconductor Fabrication," January 1964, vol. 6, No. 8, pp. 6–7.

NORMAN G. TORCHIN, Primary Examiner

E. C. KIMLIN, Assistant Examiner

U.S. Cl. X.R.

96—36.2, 45, 45.2